United States Patent

[11] 3,587,767

[72] Inventor Roger L. Gamaunt
Sunnyvale, Calif.
[21] Appl. No. 785,269
[22] Filed Dec. 19, 1968
[45] Patented June 28, 1971
[73] Assignee Lockheed Aircraft Corporation
Burbank, Calif.

[54] STEEERING ASSEMBLY FOR A VEHICLE
6 Claims, 3 Drawing Figs.
[52] U.S. Cl. .................................................. 180/79.2R,
280/95R
[51] Int. Cl. .................................................. B62d 5/06,
B62d 7/00
[50] Field of Search ................................ 180/79.2,
46; 280/80, 93, 95, 96.2, 103

[56] References Cited
UNITED STATES PATENTS
2,209,804 7/1940 Ashley.......................... 280/96.2
3,306,390 2/1967 Jamme.......................... 180/46

*Primary Examiner*—A. Harry Levy
*Attorneys*—Rodger N. Alleman and George C. Sullivan ABSTRACT: A steering assembly includes steerable wheels which are mounted to turn on wheel-supporting arms. As the wheels are turned, the supporting arms pivot outwardly to translate the wheels outwardly and to increase the clearance space between each wheel and the body of the vehicle. As the turn is completed, the wheels are straightened and the arms pivot inwardly to bring each wheel to a minimum clearance position—close to the body. The wheels are turned and are laterally translated by a Pitman-arm subassembly which is linked to both wheels and both wheel-supporting arms. The Pitman-arm assembly includes a pivotally mounted base member and two Pitman arms pivotally mounted thereon, which arms are coupled together through gear segments. The Pitman arms may spread apart and close together; and simultaneously the whole subassembly may pivot on the base member. A first hydraulic drive cylinder is coupled to spread the Pitman arms apart and to close them together; and a second hydraulic drive cylinder is coupled to pivot the base member. Both drive cylinders are hydraulically controlled by a main control valve and a proportioning valve such that the steering drive operations will be simultaneous and proportional with respect to each other.

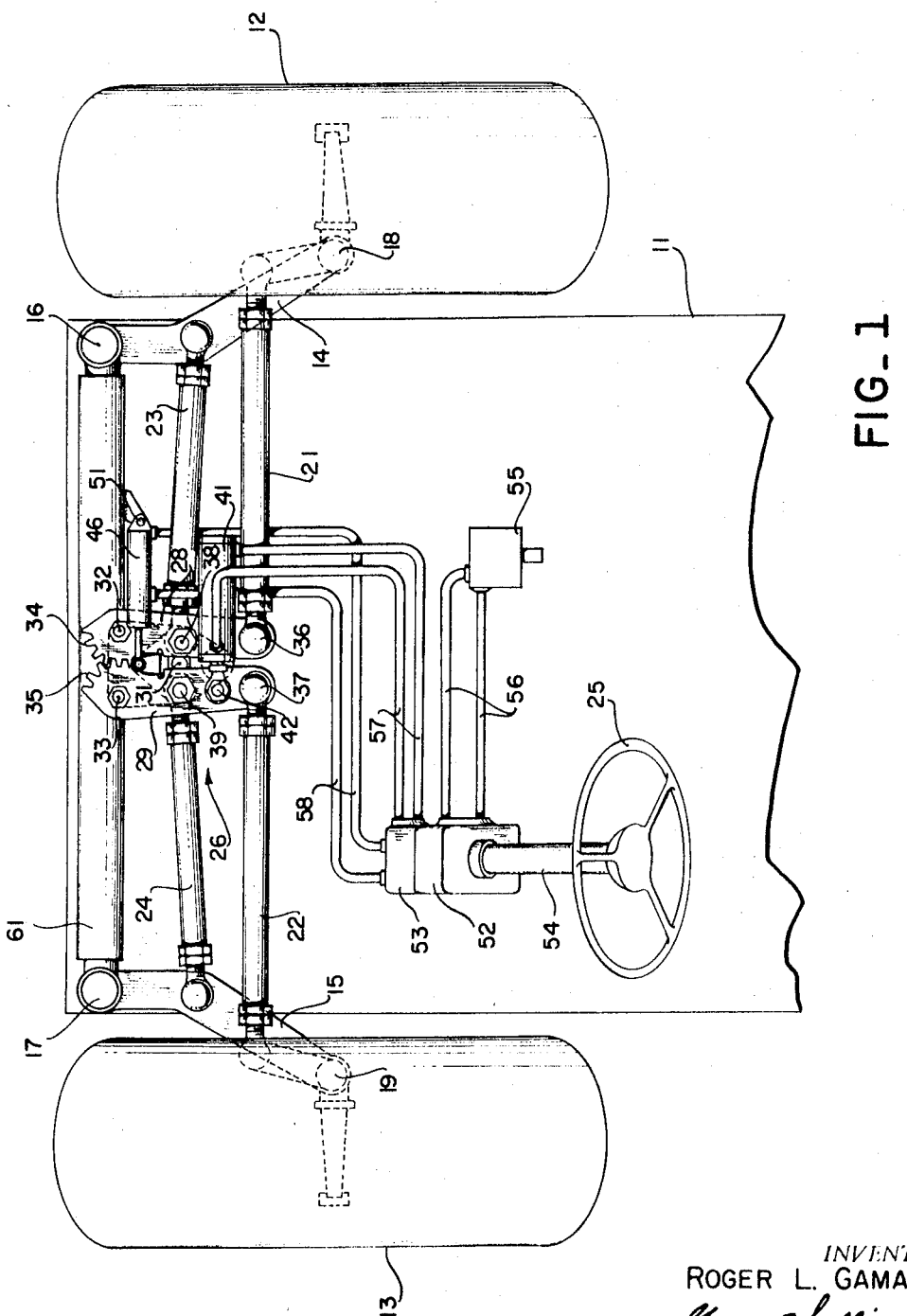

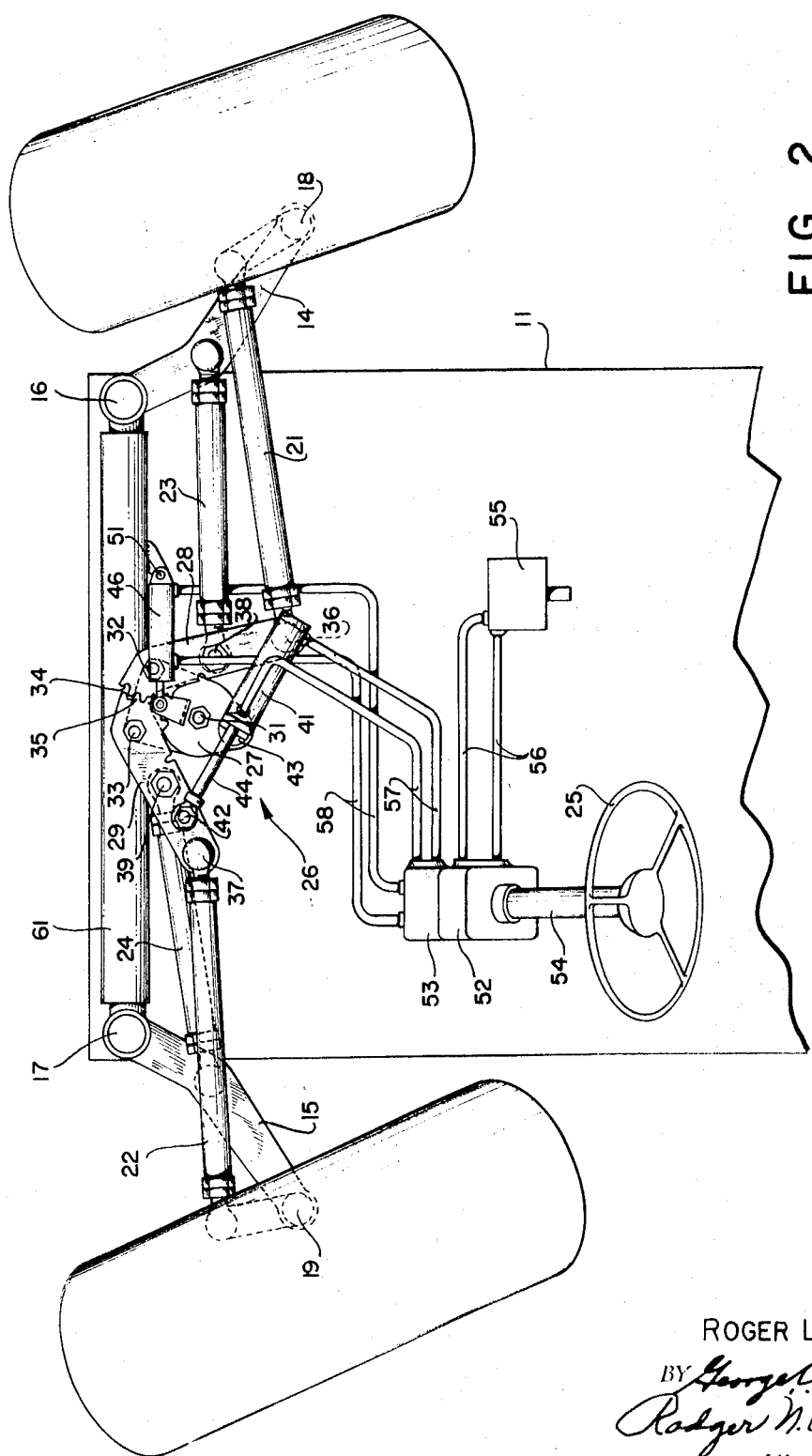

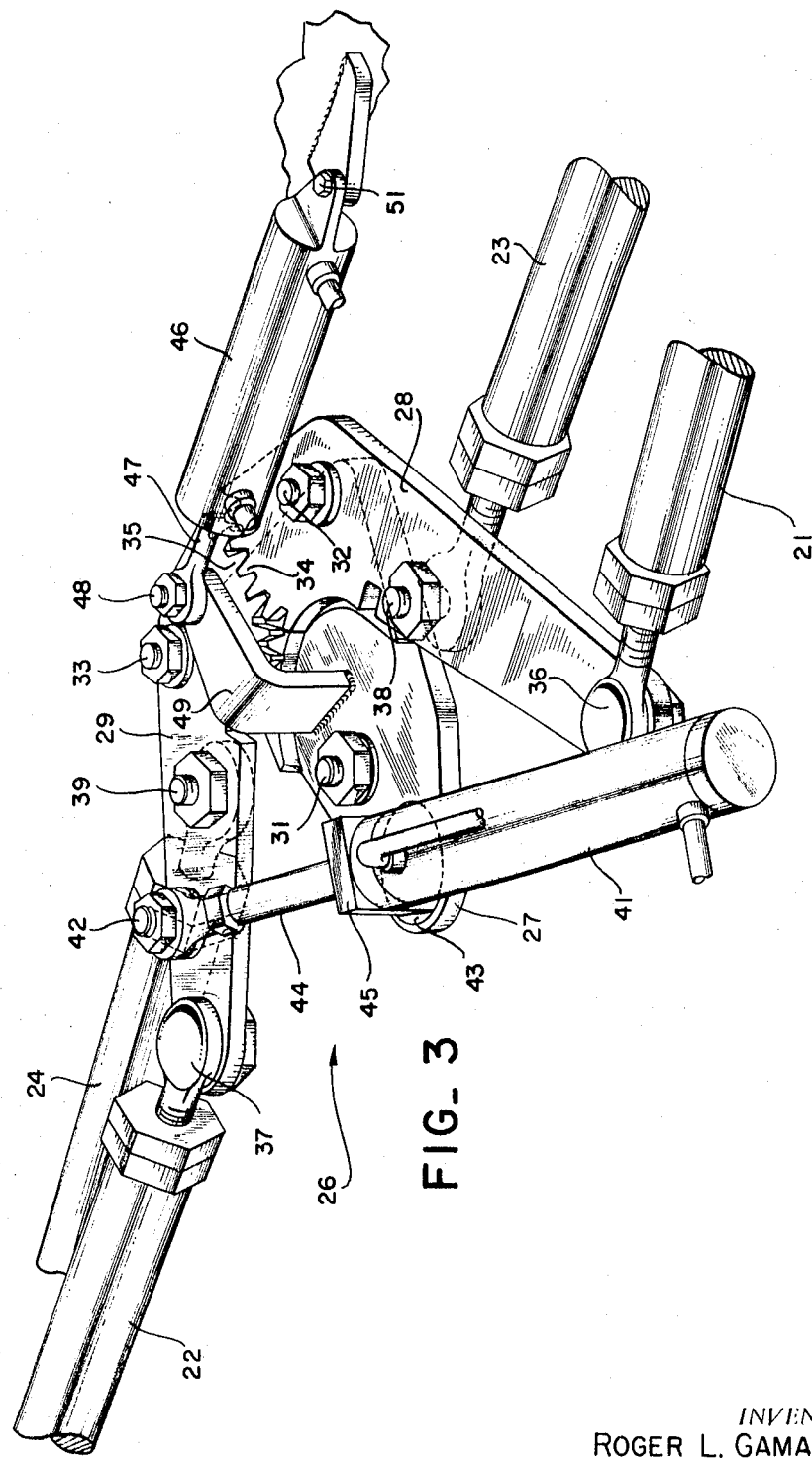

STEERING ASSEMBLY FOR A VEHICLE

BACKGROUND OF THE INVENTION

The present invention relates to wheeled vehicles, and more particularly to a steering assembly wherein the steerable wheels may be simultaneously turned out and laterally translated with respect to the vehicle to increase the clearance between each wheel and the body of the vehicle during the turn.

For purposes of this patent, the terms "turn" and "turning" will refer to the pivoting of a wheel about an axis which is substantially vertical for the purpose of steering a vehicle; and the terms "rotate" and "rotating" will refer to the spinning of a wheel about its axis of rotation which is normally horizontal. Thus a steerable wheel is "rotatable" about its axis, and the wheel may also be "turned" by a steering assembly. These two rotary movements associated with steerable wheels of vehicles will be distinguished from each other by the use of the distinctive terms of "rotating" vs. "turning."

Heretofore, vehicles have to be steered by turning steerable wheels about axes which are substantially fixed with respect to the vehicle. Thus a wheel may turn about a king pin or about a ball and socket joint. When such a wheel is in a neutral or "straight ahead" position, the plane of the wheel lies essentially parallel to the side or body of the vehicle and will require a minimum of clearance or space separation from the body of the vehicle. However, when the wheel is turned to an extreme position, the clearance space required is considerable, since the wheel is no longer flat against the side or body, but has one side extending inwardly at an angle. Presently available vehicles have solved this clearance problem by providing a large wheel well, within which the wheel remains free to turn in both directions without interference. This solution to the wheel clearance problem may result in a reduced volumetric capacity or useful carrying space for load or cargo. This is particularly detrimental for a vehicle designed to haul lumber, large crates, pipe or building materials which have long straight sides and cannot easily be fitted around a cutout area such as a wheel well. Similarly, a vehicle designed to carry rolling stock or war materials including smaller vehicles or mobile equipment could not easily be loaded and unloaded from one end if the cargo space were restricted at points by wheel wells extending thereinto.

SUMMARY OF THE INVENTION

According to this invention, a steering assembly provides steerable wheels which will be closely parallel to the body of a vehicle when in the neutral or "straight ahead" position, but which are translated outwardly from the vehicle when the wheels are turned to provide additional clearance space. The steerable wheels are mounted on wheel supporting arms which lie closely along the body of the vehicle in the neutral position; and which pivot outwardly as the wheels are turned, and pivot inwardly when the wheels are straightened. Both the wheels and the supporting arms are linked to a Pitman-arm subassembly from which the wheels are turned and the supporting arms are simultaneously translated laterally.

The Pitman-arm subassembly includes a pair of pivotal arms coupled to move in opposition by gear segments. The arms are spread apart and are closed together by a first hydraulic cylinder; and the whole subassembly is simultaneously pivoted by a second hydraulic cylinder. The hydraulic control is provided by a pair of valves which operate from the steering column of the vehicle. A main control valve controls the amount of hydraulic fluid passed to the two cylinders, and a proportioning valve passes proportional amounts of the fluid to each of the cylinders. Thus, the two hydraulic cylinders will operate simultaneously and in proportion to each other for spreading and closing the Pitman arms and for pivoting the whole subassembly.

DESCRIPTION OF THE DRAWINGS

Various features and advantages of this invention will become apparent upon a consideration of the following description taken in conjunction with the accompanying drawings which show a preferred embodiment of this invention. The views of the drawing are as follows:

FIG. 1 is a plane view of one end of a vehicle showing a steering assembly of this invention with the parts in a neutral or "straight ahead" position;

FIG. 2 is a similar plan view but with the parts of the steering assembly in a "left turn" position; and FIG. 3 is a fragmentary perspective view of the Pitman-arm subassembly with certain parts removed and with other parts broken away to show the underlying structure.

DESCRIPTION OF THE PREFERRED EMBODIMENT

Referring to FIGS. 1 and 2, a vehicle 11 is provided with a pair of steerable wheels 12 and 13 mounted on a corresponding pair of supporting arms 14 and 15. The supporting arms 14 and 15 are mounted to pivot about pivot points 16 and 17 which are substantially fixed with respect to the vehicle 11. The steerable wheels 12 and 13 are mounted to turn about pivot points 18 and 19 at the ends of the supporting arms 14 and 15. As shown in FIG. 1, the wheels 12 and 13 are in a neutral or straight ahead position and the supporting arms 14 and 15 are positioned inwardly such that the wheels are positioned closely parallel to the body of the vehicle 11 with a minimum clearance space therebetween. FIG. 2 shows the wheels 12 and 13 turned and translated outwardly from the body of the vehicle. The supporting arms 14 and 15 are pivoted and spread apart to carry the pivot points 18 and 19 and the wheels 12 and 13 thereon, outwardly from the vehicle 11.

A pair of tie rods 21 and 22 are coupled to the steerable wheels 12 and 13, and control the turning of the wheels. A pair of expanding links 23 and 24 are coupled to the supporting arms 14 and 15 for control of the pivotal movement of the supporting arms and the lateral translation and the expansion of the steerable wheels 12 and 13. In a broad aspect of this invention, the expanding links 23 and 24 may be considered as a first drive means for controlling the pivoting of the supporting arms 14 and 15 and the corresponding lateral translation of the wheels 12 and 13. Similarly the tie rods 21 and 22 may be considered as a second drive means for controlling the turning of the wheels. It may be noted from FIGS. 1 and 2 that when the wheels are turned in either direction, both supporting arms must pivot outwardly to provide clearance for the front or leading side of one wheel and the rear or trailing side of the other wheels.

FIGS. 1 and 2 show a steering wheel 25 positioned to indicate that the forward motion of the vehicle 11 is toward the top of the drawing with the steerable wheels in the front of the vehicle; but it will be appreciated that the vehicle could be provided with steerable wheels in the rear without departing from this invention. Indeed, it is contemplated that a vehicle may be provided with steerable wheels at both ends of the vehicle such that the rear wheels will act independently or will exactly track the front wheels. An exceptionally large vehicle may be provided with pairs of steerable wheels in both ends and with a pair of nonsteerable wheels in the center. For purposes of this patent specification the vehicle 11 will be described as moving forwardly toward the top of the drawing; and in FIG. 2 the vehicle will be assumed to be making a left turn.

Since both supporting arms 14 and 15 pivot outwardly, to turn left (FIG. 2) it is necessary that both tie rods 21 and 22 move outwardly to compensate for the lateral translation of the wheels 12 and 13. The pivot point 19 for the inside wheel 13 translates outwardly; and, therefore, the tie rod 22 must move outwardly by a first increment merely to compensate for the outward translation of the pivot point 19 and by another increment to effect a turning of the wheel about the pivot point. Considering the wheel 12 on the outside of the turning circle (FIG. 2), it may be appreciated that the pivot point 18 is translated outwardly from the center of the vehicle 11. The tie rod 21 must likewise move outwardly by a first increment to compensate for the lateral translation of the pivot point and must move a negative increment (inwardly) to effect a turning of the wheel. As shown in FIG. 2 there is a net outward movement of the tie rod 21 which is the combination of the two increment of movement.

In addition to the two increments of movement which must be imparted to both tie rods 21 and 22, it is necessary to impart a sharper turn to the wheel 13 on the inside of the turning circle than to the wheel 12 on the outside of the turning circle. Since the wheels do not turn by the same angles, it is not necessary that the outside wheel 12 be laterally translated to the same extent as the inside wheel 13. Thus FIG. 2 shows the inside wheel 13 turned at a greater angle and laterally translated to a greater extent than the outside wheel 12. This is accomplished by controlled and proportional movement of the tie rods 21 and 22 and the expanding links 23 and 24 by the operation of a Pitman-arm subassembly 26.

The Pitman-arm subassembly 26, best shown by FIG. 3, includes a base member 27 and two Pitman arms 28 and 29. The base member 27 is mounted to pivot about a pivot pint 31 which is fixed with respect to the vehicle. The Pitman arms 28 and 29 are mounted to pivot about pivot points 32 and 33 on the base member 27. The Pitman arms include gear sectors 34 and 35 which are engaged such that the arms are mechanically coupled to move oppositely with respect to each other. Thus it is seen that the arms may spread apart and close together, and the whole Pitman subassembly 26 may pivot as a unit about the fixed point 31. The tie rods 21 and 22 are coupled to the ends of the Pitman arms at respective pivot points 36 and 37. The expanding links 23 and 24 are coupled to the Pitman arms at pivot point 38 and 39 which are positioned intermediately along the Pitman arms.

A first hydraulic drive cylinder 41 coupled between a pivot point 42 on the Pitman arm 29 and a pivot point 43 on the base member 27. As shown in FIG. 3, the piston rod 44 is coupled to the arm 29 and the outer part of the cylinder 41 is coupled to base member 27 by such means as a bracket 45. When the hydraulic drive cylinder 41 expands, the Pitman arms 28 and 29 spread apart as shown in FIG. 2. When the hydraulic drive cylinder 41 contracts, the Pitman arms close together as shown in FIG. 1.

A second hydraulic drive cylinder 46 (shown in phantom in FIG. 3) is coupled to pivot the base member 27 and thereby to pivot the whole subassembly 26. Thus the piston rod 47 of the cylinder 46 is coupled to a pivot point 48 positioned on a bracket 49 which is welded to and is an integral part of the base member 27. The bracket part 49 overlies the meshing teeth of the sector gears 34 and 35, and thereby provides an offset position for the pivot point 48 to avoid interference with the sector gears. The outer part of the drive cylinder 46 is coupled to a pivot point 51 which is fixed with respect to the vehicle. Thus it will be appreciated that the second hydraulic drive cylinder 46 serves to controllably pivot the base member 27 and the whole Pitman subassembly.

As shown in FIGS. 1 and 2, the control of both hydraulic drive cylinders is by a main control valve 52 and a proportioning valve 53 which may operate directly from a steering column 54 and the steering wheel 25. A pump 55 or other pressure source furnished hydraulic fluid under pressure via tubing or other ducts 56 to the main control valve 52. Two tubes or ducts are shown representing a high-pressure duct and a low-pressure return. A controlled amount of hydraulic fluid is passed from the main valve 52 to the proportioning valve 53. The proportioning valve 53 divides the flow of hydraulic fluid between ducts 57 leading to the first hydraulic drive cylinder 41, and further ducts 58 leading to the second hydraulic drive cylinder 46. The main control valve 52 and the proportioning valve 53 pass controlled and proportional amounts of hydraulic fluid to both of the hydraulic drive cylinders 41 and 46, such that the operation of the two cylinders will be simultaneous and proportional. Therefore the Pitman subassembly is pivoted as a unit at the same time that the Pitman arms are spread apart or close together.

When the subassembly 26 is pivoted the wheels are turned since one of the tie rods is extended while the other is withdrawn. Obviously, this affects the wheels oppositely, tending to turn one out and the other in. Simultaneously, the Pitman arms are spread apart and both supporting arms 14 and 15 are likewise spread apart thereby translating both wheels 12 and 13 outwardly away from the body of the vehicle. Since the tie rods 22 and 23 are coupled to the Pitman arms, a compensating increment of movement will be imparted to the tie rods to maintain the relative angular relation about the turning pivots 18 and 19 even though the pivots are translated to a new position. And finally, the angular movement of each Pitman arm is modified by the rotative position of the Pitman subassembly such that the effect on the two wheels will not be equal. An Ackerman effect is thereby produced whereby the wheel on the inside of the vehicle's turning circle is turned more sharply and is translated further outwardly than the wheel on the outside of the vehicle's turning circle.

It was indicated heretofore that the pivot points 16 and 17 are substantially fixed with respect to the vehicle. As shown in FIGS. 1 and 2, the pivots 16 and 17 are positioned at the ends of a torsion bar 61. Thus the pivots are essentially on a spring suspension and are free to move somewhat under impacts and stresses. The suspension system therefore allows the supporting arms 14 and 15 to move vertically to some degree under the shocks which would be encountered when the wheels strike bumps as the vehicle moves over uneven terrain.

I claim:

1. A steering assembly for a vehicle comprising:
   a pair of steerable wheels on opposite sides of the vehicle,
   a wheel-supporting arm associated with each of the wheels, each wheel-supporting arm being pivotally mounted at one end to a fixed point on the vehicle and having;
      a pivotal connection for supporting and allowing each respective wheel to turn thereon,
      a spreading link coupled to each of the wheel's supporting arms for pivoting the arm and translating the pivotal connection and wheel thereon laterally with respect to the vehicle;
      a tie rod coupled to turn the wheel about the pivotable connection of the wheel-supporting arm,
   a Pitman-arm subassembly drivingly coupled to the spreading links and to the tie rods, said subassembly comprising;
      a base member mounted to pivot about a fixed point on the vehicle,
      a pair of Pitman arms pivotally mounted on the base member,
      said Pitman arms being coupled to pivot simultaneously and in opposite directions with respect to the base member whereby said Pitman arms will simultaneously pivot as a unit with the base member and spread apart and move together;
   said tie rods being coupled to the ends of the Pitman arms;
   and said spreading links being coupled to intermediate points on the Pitman arms.

2. A steering apparatus in accordance with claim 1, wherein said Pitman arms include gear segments which are engaged to coupled the Pitman arms for simultaneous pivotal movements for spreading apart and closing together the Pitman arms.

3. A steering assembly in accordance with claim 1, further comprising:
   a first drive means coupled to pivot and to spread apart the Pitman arms;
   a second drive means coupled to pivot the base member; and
   a proportional means controllably coupled to both drive means for causing both drive means to operate simultaneously and in a proportional relation with each other.

4. A steering assembly for a vehicle comprising:
   a pair of steerable wheels;

a wheel-supporting arm associated with each of the steerable wheels;

each wheel-supporting arm having one end pivotally mounted at a fixed point on the vehicle and having a pivotal connection for supporting and allowing the respective wheel to turn thereon;

a Pitman arm subassembly including:

a base member mounted to pivot at a fixed point on the vehicle;

a pair of Pitman arms having gear segments engaged with each other, and mounted to pivot about respective points on the base member;

a pair of expanding links each coupled between the Pitman arm assembly and a respective one of the wheel supporting arms for pivoting the arm and translating the wheels laterally with respect to the vehicle;

a pair of the tie rods each coupled between one of the Pitman arms and a respective one of the steerable wheels for turning the wheels;

a first hydraulic drive cylinder coupled between the Pitman arms for spreading the arms apart and for closing the arms together; and a second hydraulic drive cylinder coupled to the base member for turning the Pitman-arm subassembly.

5. A steering assembly for a vehicle in accordance with claim 4 wherein each of the tie rods connects between the end of a Pitman arm and the respective one of the steerable wheels, and wherein each of the expanding links connects between an intermediate point on one of the Pitman arms and an intermediate point on the respective one of the wheel-supporting arms.

6. A steering assembly for a vehicle in accordance with claim 4 and further comprising:

a source of hydraulic fluid under pressure;

a hydraulic control valve coupled to the source for passing a controlled quantity of hydraulic fluid; and a proportioning valve coupled between the control valve and the two hydraulic drive cylinders for passing proportional amounts of the hydraulic fluid to both drive cylinders for simultaneous and proportional operation of the cylinders.